United States Patent
May et al.

(10) Patent No.: US 10,246,072 B2
(45) Date of Patent: Apr. 2, 2019

(54) REAR CARGO REMINDER SYSTEM

(71) Applicant: Nissan North America, Inc., Franklin, TN (US)

(72) Inventors: Wade May, Farmington, MI (US); Dion Richter, Ferndale, MI (US); Christopher Fischer, Birmingham, MI (US)

(73) Assignee: Nissan North America, Inc., Franklin, TN (US)

(*) Notice: Subject to any disclaimer, the term of this patent is extended or adjusted under 35 U.S.C. 154(b) by 0 days.

(21) Appl. No.: 15/333,865

(22) Filed: Oct. 25, 2016

(65) Prior Publication Data
US 2018/0111597 A1   Apr. 26, 2018

(51) Int. Cl.
*B60W 10/00* (2006.01)
*B60W 50/00* (2006.01)

(52) U.S. Cl.
CPC ........ *B60W 10/00* (2013.01); *B60W 50/0097* (2013.01); *B60W 2422/95* (2013.01); *B60W 2510/1005* (2013.01); *B60W 2520/10* (2013.01); *B60Y 2400/902* (2013.01)

(58) Field of Classification Search
CPC ............ B60W 10/00; B60W 50/0097; B60W 2422/95; B60W 2510/1005; B60W 2520/10; B60Y 2400/902; B60N 2/002; B60Q 3/30
See application file for complete search history.

(56) References Cited

U.S. PATENT DOCUMENTS

| | | |
|---|---|---|
| 5,949,340 A | 9/1999 | Rossi |
| 6,489,889 B1 | 12/2002 | Smith |
| 6,727,823 B2 | 4/2004 | Ando et al. |
| 6,922,147 B1 | 7/2005 | Viksnins et al. |
| 6,922,622 B2 | 7/2005 | Dulin et al. |
| 7,079,016 B2 | 7/2006 | Ho et al. |
| 7,106,203 B2 | 9/2006 | Edwards et al. |
| 7,170,401 B1 | 1/2007 | Cole |
| 8,154,394 B2 | 4/2012 | Hansen |
| 8,493,201 B2 | 7/2013 | Orbach |
| 8,970,362 B2 | 3/2015 | Morley et al. |
| 9,734,695 B2 | 8/2017 | Henry et al. |
| 2003/0122662 A1 | 7/2003 | Quinonez |
| 2005/0200465 A1 | 9/2005 | Fabors et al. |
| 2008/0218381 A1* | 9/2008 | Buckley ............... B60Q 1/50 340/932.2 |

(Continued)

*Primary Examiner* — Mohamed Barakat
(74) *Attorney, Agent, or Firm* — Global IP Counselors, LLP

(57) ABSTRACT

A vehicle rear cargo reminder system having a front door sensor, a rear door sensor, an alerting device and a controller. The front door sensor being configured to detect opening movement and closing movement of a front door. The rear door sensor configured to detect opening movement and closing movement of a rear door. The alerting device is configured to provide an alarm signal. The controller detects a sequence of events via the front door sensor and the rear door sensor. The controller determines whether or not an object might be located beside or on the rear seat of the passenger compartment, and operates the alerting device to provide the alarm signal to the vehicle operator in the absence of detection of conditions of an ignition switch of the vehicle.

12 Claims, 4 Drawing Sheets

(56) References Cited

U.S. PATENT DOCUMENTS

| | | | |
|---|---|---|---|
| 2012/0050021 A1* | 3/2012 | Rao | B60N 2/002 340/425.5 |
| 2012/0268265 A1* | 10/2012 | Morley | B60N 2/002 340/457 |
| 2014/0015664 A1 | 1/2014 | Watson | |
| 2014/0043155 A1* | 2/2014 | Shaw | B60Q 9/00 340/457 |
| 2015/0165932 A1* | 6/2015 | Maley | B60N 2/002 340/457 |
| 2015/0266395 A1 | 9/2015 | Bradley et al. | |
| 2016/0144781 A1* | 5/2016 | Kleinert | B60Q 9/00 701/36 |
| 2016/0221583 A1 | 8/2016 | Valeri et al. | |
| 2016/0280067 A1* | 9/2016 | Cuddihy | B60N 2/00 |

\* cited by examiner

REAR CARGO REMINDER SYSTEM

BACKGROUND

Field of the Invention

The present invention generally relates to a rear cargo reminder system. More specifically, the present invention relates to rear cargo reminder system configured to monitor activity of a vehicle operator and warn the vehicle operator in response to determining that the vehicle operator has have left an object on or adjacent to a rear seat of the vehicle.

Background Information

Vehicle operators routinely place objects, such as cargo, groceries and child seats on or adjacent to rear seats of a vehicle. Occasionally the vehicle operator forgets that the cargo or other objects have been left within the vehicle.

SUMMARY

One object of the present disclosure is to provide a vehicle with an apparatus or system that monitors vehicle operator activity and based upon that activity warns the vehicle operator that cargo or other objects have apparently been left on or adjacent to a rear seat of the vehicle.

In view of the state of the known technology, one aspect of the present disclosure is to provide a rear cargo reminder system within a vehicle having a passenger compartment with a rear seat. A front door is fixed to the vehicle for movement between an open orientation and a closed orientation. A front door sensor is configured to detect opening movement and closing movement of the front door. A rear door is attached to the vehicle for movement between an open orientation providing access to the rear seat and a closed orientation. A rear door sensor is installed within the vehicle and configured to detect opening movement and closing movement of the rear door. An alerting device is configured to provide an alarm signal. The controller is operably connected to each of the front door sensor, the rear door sensor and the alerting device, such that in response to the controller detecting a sequence of events based on detection of movement of the front door via the front door sensor and movement of the rear door via signals from the rear door sensor, the controller determines whether or not the vehicle operator has potentially left an object beside or on the rear seat of the passenger compartment. In response to determining that the vehicle operator has potentially left an object beside or on the rear seat of the passenger compartment, the controller operates the alerting device to provide the alarm signal to the vehicle operator in the absence of detection of conditions of an ignition switch of the vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
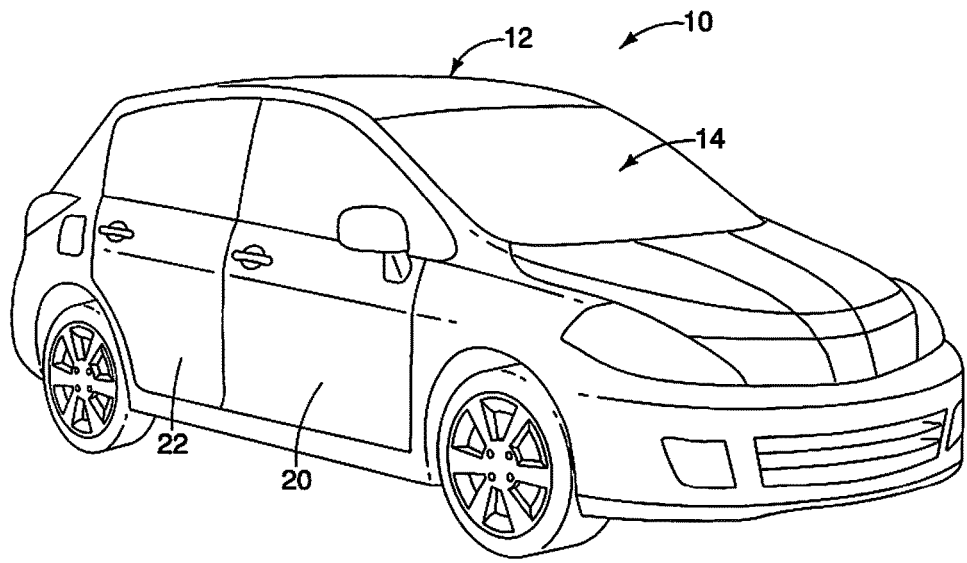
FIG. 1 is a perspective view of a vehicle having front doors, rear doors and a rear cargo reminder system in accordance with a first embodiment.
Figure 2:
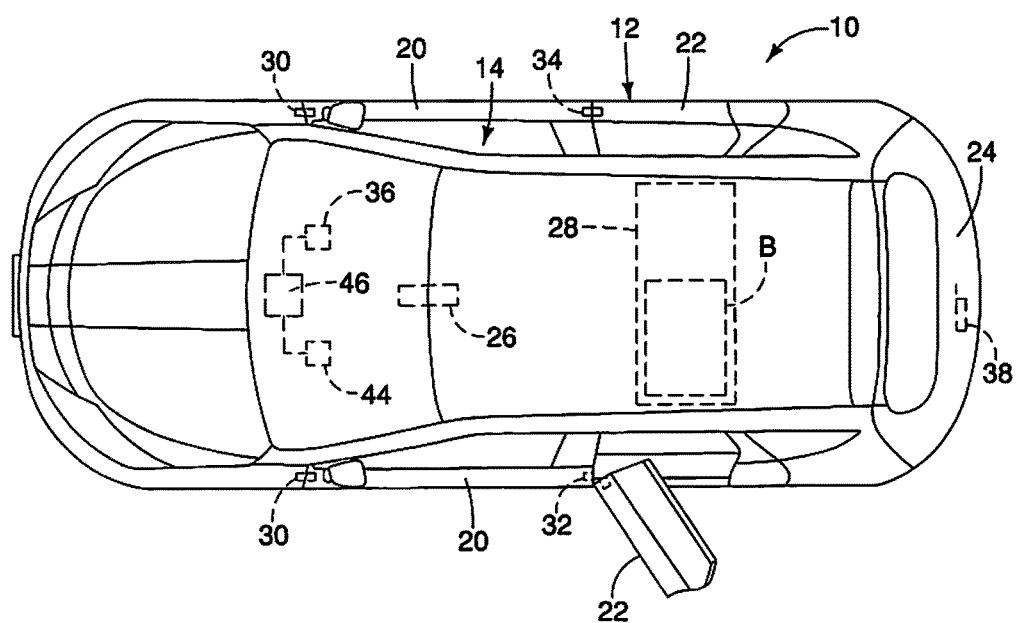
FIG. 2 is a top view of the vehicle showing one of the rear doors in an open orientation in accordance with the first embodiment.

Referring initially to FIGS. 1 and 2, a vehicle 10 is illustrated in accordance with a first embodiment. The vehicle 10 includes a vehicle body structure 12 that defines a passenger compartment 14 and includes a rear cargo reminder system 16 within the vehicle 10, as shown in FIG. 2. The passenger compartment 14 can be a passenger compartment within the vehicle 10 or can be the passenger compartment combined with a cargo area at the rear of the vehicle 10, depending upon the overall design and configuration of the vehicle 10.

In a first embodiment, the vehicle 10 is a hatchback vehicle that has four passenger access doors including two front doors 20, two rear doors 22 and a rear hatch door 24. The front doors 20 are fixed to the vehicle body structure 12 for movement between an open orientation and a closed orientation in a conventional manner. Similarly, the rear doors 22 are attached to the vehicle body structure 12 for movement between a first position exposing rear seats 28 within the passenger compartment 14 and a second position at least partially concealing the rear seats 28 of the passenger compartment 14. The area of the passenger compartment having the rear seats 28 and accessed by the rear doors 22 is also referred to herein as a rearward area of the passenger compartment 14.

Figure 3:
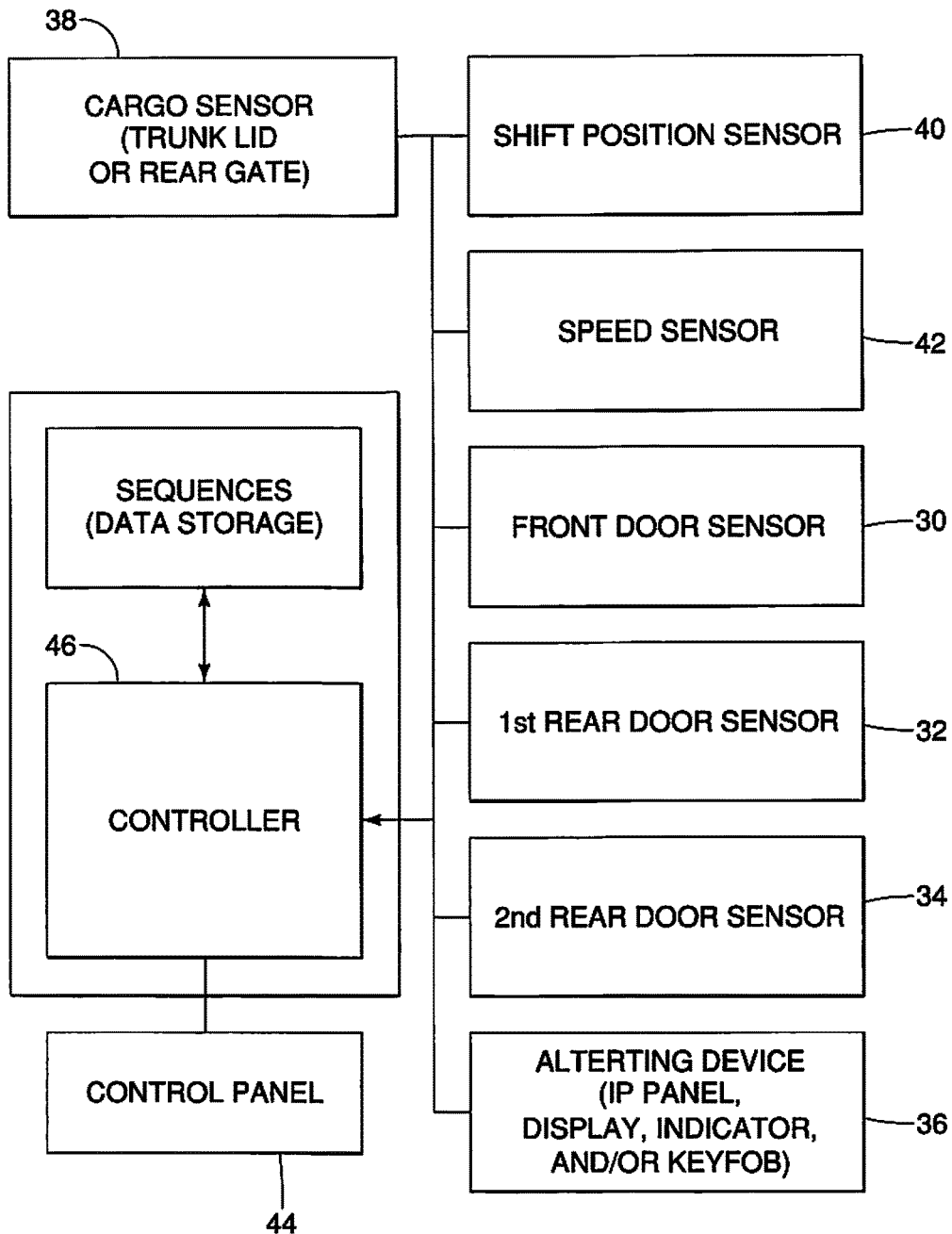
FIG. 3 is a block diagram showing elements of the rear cargo reminder system of the vehicle in accordance with the first embodiment.

As shown in FIG. 3, the rear cargo reminder system 16 includes a front door sensor 30, a first rear door sensor 32, a second rear door sensor 34, an alerting device 36, a cargo gate sensor 38, a shifter position sensor 40, a speed sensor 42, a control panel 44 and a controller 46.

As shown in FIG. 2, the front door sensors 30 are installed relative to the front doors 20 such that the front door sensors 30 detects an opening movement of the front doors 20 and detects closing movement of the front doors 20. The first rear door sensor 32 is installed relative to a first of the rear doors 22 such that the first rear door sensor 32 detects an opening movement of the first of the rear doors 22 and detects closing movement of the first of the rear doors 22. Similarly, the second rear door sensor 34 is installed relative to a second of the rear doors 22 such that the second rear door sensor 34 detects an opening movement of the second of the rear doors 22 and detects closing movement of the second of the rear doors 22. Further, the cargo gate sensor 38 is installed relative to the rear hatch door 24 such that the cargo gate sensor 38 detects an opening movement of the rear hatch door 24 and detects closing movement of the second of the rear hatch door 24.

The alerting device 36, the shifter position sensor 40, the speed sensor 42, the control panel 44 and the controller 46 are all installed within the vehicle body structure 12. Specifically, the alerting device 36, the control panel 44 and the controller 46 are installed within the instrument panel of the vehicle 10. The shifter position sensor 40 can be installed within a transmission (not shown) of the vehicle, or can be installed within a transmission shifter structure 26 within the passenger compartment 14. The shifter position sensor 40 is configured to detect the current setting of a shifter mechanism 26 of the transmission. For example, if the transmission is shifted from P (Park) to D (Drive), 2 (second gear), 1 (first gear) or R (reverse) the shifter position sensor 40 detects the movement and detects the current position or setting of the shifter mechanism 26.

The speed sensor 42 can be installed within the transmission or within the instrument panel of the vehicle 10. The speed sensor 42 is configured to detect the current speed of the vehicle 10.

In the logic employed by the controller 46 as described below, there are several steps where the controller 46 monitors the current position of the shifter mechanism 26 via signals from the shifter position sensor 40 and also monitors the current speed of the vehicle 10 via the speed sensor 42. In the description below the shifter position sensor 40 and the speed sensor 42 are characterized such that the controller 46 monitors only one or the other of the shifter position sensor 40 and the speed sensor 42. However, it should be understood from the drawings and the description herein that the controller 46 can alternatively monitor both the shifter position sensor 40 and the speed sensor 42. In those steps where both the shifter position sensor 40 and the speed sensor 42 are mentioned, the controller 46 can use signals from just one of the shifter position sensor 40 and the speed sensor 42, or signals from both. Hence, only one of the shifter position sensor 40 and the speed sensor 42 is required for operation of the rear cargo reminder system 16. Specifically, the rear cargo reminder system 16 can include both the shifter position sensor 40 and the speed sensor 42, or can include only the shifter position sensor 40, or can include only the speed sensor 42.

The control panel 44 can include a visual display used by the controller 46 and also includes an inputting capability. For example, if the control panel 44 includes a visual display, the visual display can include touch screen technology, or a series of mechanical buttons that allow the vehicle operator to select options. For example, the visual display of the control panel 44 can display prompts for the vehicle operator inquiring whether or not the vehicle operator wants the alert system to be enabled, or disabled. The visual display of the control panel 44 can also display visual alerts and/or text reminders of the possibility that cargo has been left beside or on the rear seat 28 of the vehicle 10, as is described in greater detail below.

The rear cargo reminder system 16 does not monitor activity related to the ignition switch (not shown) of the vehicle 10. More specifically, the logic (presented below) used by the rear cargo reminder system 16 in determining whether or not cargo has been left adjacent to or on the rear seat 28 of the vehicle does not make use of the current operational state of the ignition switch, does not include an ignition switch sensor nor does the controller 46 monitor ignition switch activity. The rear cargo reminder system 16 does not monitor actions taken by the vehicle operator as they relate to operation of the ignition switch. In other words, the rear cargo reminder system 16 operates without regard for the status of the ignition switch of the vehicle 10. Put another way, the rear cargo reminder system 16 uses logic and monitors actions in the absence of any actions relating to the ignition switch.

Further, the rear cargo reminder system 16 does not include any type of occupancy sensor, such as a microphone, temperature sensor, seat weight sensor, movement sensor or any other type of sensor that is primarily configured to detect the presence or absence of an occupant within the vehicle 10. More specifically, the logic (presented below) used by the rear cargo reminder system 16 in determining whether or not cargo has been left adjacent to or on the rear seat 28 of the vehicle does not make use of any kind of occupancy sensor nor does the controller 46 monitor occupancy related sensors. Rather, the rear cargo reminder system 16 monitors opening and closing movements of the front and rear doors 20 and 22, and the rear hatch door 24 (or trunk lid) and monitors the current status of the shifter mechanism 26 and/or current speed of the vehicle 10. In other words, the controller 46 does not need to employ sensors in a vehicle other than sensors that are already present a vehicle that does not include the rear cargo reminder system 16. Specifically, with or without the rear cargo reminder system 16, the vehicle 10 includes the front door sensors 30, the rear door sensors 32 and 34, the cargo sensor 38, the shift position sensor 40 and the speed sensor 42 as part of the original equipment of the vehicle 10.

The alerting device 36 can be any of a variety of device, such as a convention vehicle security alarm or can be a dedicated alarm device installed within the vehicle 10 and configured to operate solely with the controller 46 in a manner described in greater detail below. Further, the alerting device 36 can include a display (not shown) installed to the instrument panel within the passenger compartment 14 and the alarm signal includes a visual signal provided on the display. Alternatively, the alerting device 36 can work in concert with the visual display of the control panel 44 to display visual alerts to inform the vehicle operator that cargo may possibly be present beside or on the rear seat 28 of the vehicle 10. More specifically, the alerting device 36 provides an alarm signal or alert signal such as an audible sound and/or a visual alert. Alternatively, the alerting device 36 can be included in a keyfob (not shown) that is configured to remotely lock and unlock the doors 20 and 22. The keyfob (not shown) can be configured to provide an audible alarm and/or a vibration (vibratory alert) that also serves as an alarm or alert to the vehicle operator. Further, the vehicle 10 can be provided with the alerting device 36 as described above, installed within the vehicle 10, in concert with the separate handheld keyfob (not shown) typically kept in the vehicle operator's pocket or purse.

A description of operations of the controller 46 is now described with reference to FIG. 3 and the logic steps set forth in FIGS. 4 and 5. As shown in FIG. 3, the controller 46 is operably connected to each of the front door sensors 30, the rear door sensors 32 and 34, the alerting device 36, the cargo sensor 38, the shift position sensor 40, the speed sensor 42 and the control panel 44. The controller 46 also includes a data storage portion that stores data such as activity related information (activity related sequence data) and display information for the visual display of the control panel 44, as is described in greater detail below.

The controller 46 is configured such that in response to the controller 46 detecting and determining that predetermined sequences of activity events have occurred, the controller 46 operates the alerting device 36 and/or the control panel 44 to provide the alarm or alert signal to the vehicle operator. The predetermined sequences of activity events are based on opening movement and closing movement of the front door(s) 20 as detected via signals from the front door sensors 30, opening movement and closing movement of one or both of the rear doors 22 via signals from the sensors 32 and 34. Some of the activity events (sequences of activity events) also include determining whether or not the vehicle 10 is in motion via the speed sensor 42, and/or whether or not the vehicle 10 is in P (Park) or not in P (park) via the shift position sensor 40.

However, it should be understood from the drawings and the description herein that the controller 46 is specifically designed and configured such that there is no detection or monitoring of actions relating to operation of the vehicle ignition device. In other words, the activity monitoring actions and alert producing actions of the controller 46 completely ignore any actions relating to an ignition switch of the vehicle 10. The controller 46 makes no distinction between the engine of the vehicle 10 being operated and the engine of the vehicle 10 not being operated with regard to monitoring of vehicle activity. Using the detected activity events, the controller 46 determines whether or not the vehicle operator has potentially place an object B (FIG. 2) or objects 13 adjacent to or on the rear seat 28 of the vehicle 10 within the passenger compartment 14. In response to determining that the vehicle operator has potentially left the object B adjacent to or on the rear seat 28 of the passenger compartment 14, the controller 46 operates the alerting device 36 and/or the control panel 44 to provide an alarm or alert signal to the vehicle operator warning the vehicle operator that the object B appears to still be in the rearward area (the rear seat 28).

The control panel 44 can also include control mechanisms or mechanical switches (not shown) that are configured to be manually operated by the vehicle operator such that the vehicle operator can manually activate and de-activate the rear cargo reminder system 16. The control panel 44 can be a separate panel of the instrument panel (not shown) of the vehicle 10, or can be part of other input systems incorporated into the instrument panel, such as a vehicle operation monitoring system. As mentioned above, the vehicle 10 can be provided with a means for activating and de-activating the rear cargo reminder system 16 that is part of the control panel 44 or, for example, the instrument panel of the vehicle 10 can be provided with a switch and/or separate an interactive display that includes a menu for activating and de-activating the rear cargo reminder system 16.

Figure 4:
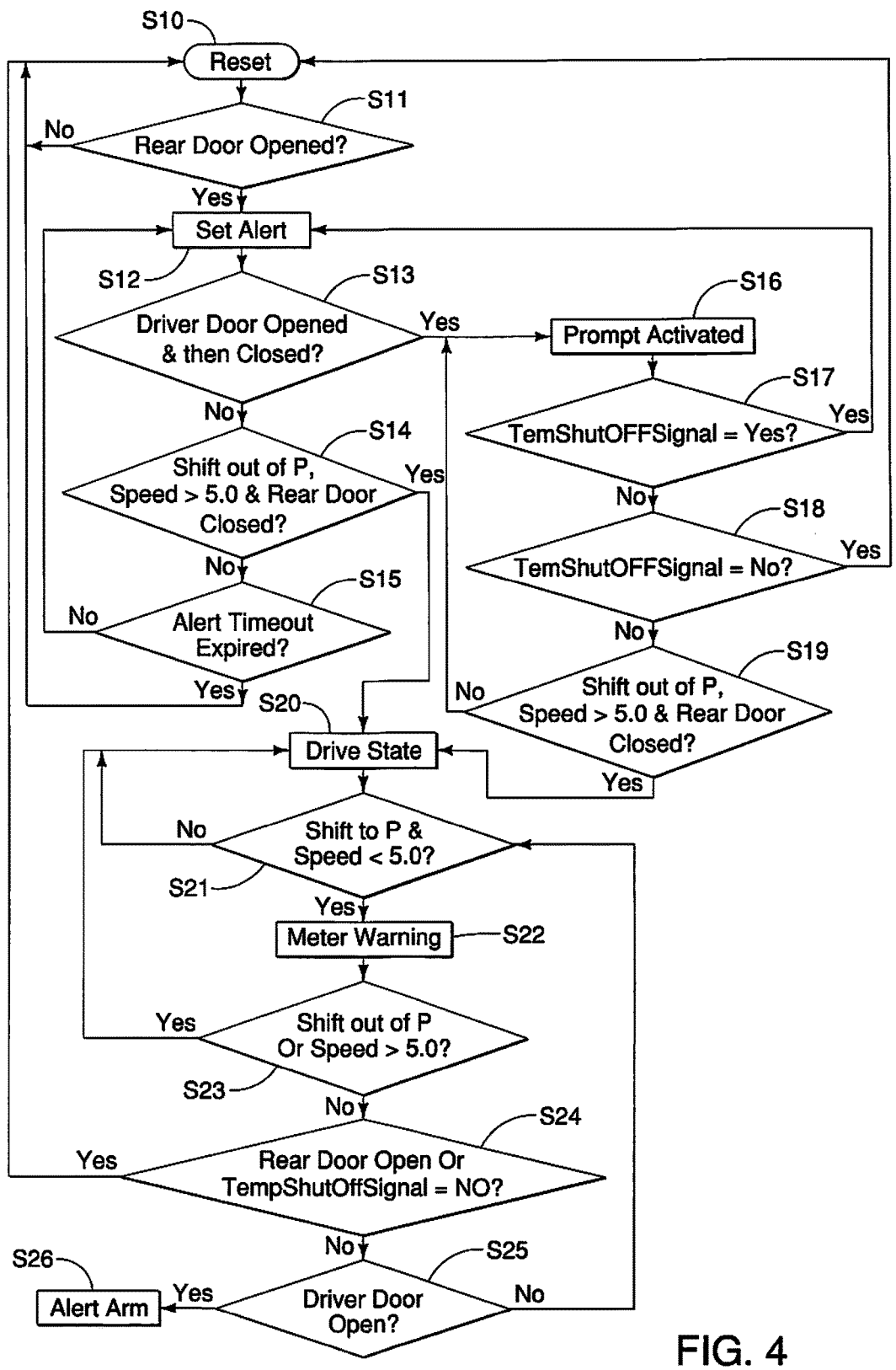
FIG. 4 is a first flowchart showing basic operational steps of the rear cargo reminder system in accordance with the first embodiment.

FIG. 4 shows an example of basic logic used in the operation of the rear cargo reminder system 16. Specifically, the controller 46 starts operating in response to any of a variety of factors, such as the keyfob (not shown) being in proximity of the vehicle 10, or operation of the keyfob to unlock the doors of the vehicle 10. The controller 46 looks into the data storage portion and determines whether or not the rear cargo reminder system 16 has been activated for operation by the vehicle operator, as manually selected via the control panel 44. If the rear cargo reminder system 16 is in an activated mode, then the operations depicted in FIGS. 4 and 5 can proceed.

At step S10, the controller 46 goes through an initialization process which includes entering a Reset mode where activities are monitored by the controller 46, as described below. At initialization of the Reset mode, all previously monitored movement activities are deleted, and monitoring of actions starts anew. Further in the Reset mode, the controller 46 checks to see whether or not the vehicle operator has made an input via the control panel 44 to either enable or dis-able the rear cargo reminder system 16.

At step S11, the controller 46 determines whether or not one of the rear doors 22 has been opened and then closed, which the controller 46 accepts as a possible indication that cargo B has been place adjacent to or on the rear seat 28 of the vehicle 10. This event (opening and then closing of one of the rear doors 22) is a triggering event. If the controller 46 determines that one of the rear doors 22 has been opened and then closed, operation then moves to step S12 and activity of the vehicle 10 is fully monitored. If not, operation moves back again to step S10 where the controller 46 continues to monitor activity of the vehicle 10.

At step S12, the controller 46 sets the alert system to active. In other words, the controller 46 is set such that, depending upon subsequently monitored actions, the controller 46 can trigger an alert warning the vehicle operator that there may be cargo adjacent to or on the rear seat 28. At this time, no alarm is triggered, but rather the actions monitored in step S11 cause the controller 46 to monitor activity that can trigger an alert. Further, the controller 46 can optionally cause the control panel 44 to display a prompt for the vehicle operator inquiring whether or not the rear cargo reminder system 16 is to be enabled or disabled.

While steps S13, S14 and S15 are depicted in a sequence in FIG. 4, it should be understood from the drawings that the controller 46 monitors activity related to each of steps S13, S14 and S15, simultaneously. Therefore, any of the actions monitored by the controller 46 related to steps S13, S14 and 15 can trigger a corresponding movement to a further corresponding step in the flowchart depicted in FIG. 4.

Specifically, at step S13, the controller 46 determines whether or not the driver's door has been opened and then closed. If so, then operation moves to step S16 described further below. If not, at step S14 the controller 46 determines whether or not certain conditions are met such as, is the vehicle in motion and is the rear door closed? Specifically, at step S14 the controller 46 determines whether or not the shifter mechanism 26 has been moved out of P (Park) and into, for example, R (Reverse) or D (Drive), or is the vehicle speed greater than 5 MPH; and is the rear door 22 closed? If one of the first two conditions are met and the third condition is met, then the controller 46 determines that the vehicle 10 is being driven and is therefore in a Drive State represented at step S20. If the above conditions are not met, then the controller 46 continues monitoring activities of the vehicle 10. At step S15, the controller 46 determines whether or not an Alert Timeout time period has expired. If an Alert Timeout has expired, then operation returns to the Reset state shown in step S10. If an Alert Timeout time period has not expired, then operation returns to step S12 where the Alert has been set, so that the controller 46 can continue monitoring vehicle activity.

The Alert Timeout time period is a predetermined period of time that can be a value of, for example, 10 minutes, but can be a lengthier time period or a shorter time period. The Alert Timeout is triggered when the rear door is opened and then closed, as monitored at step S11. Specifically, if there are no other actions monitored during the Alert Timeout time period, then at the expiration of the Alert Timeout time period, the controller 46 returns to the Reset state in step S10. If there are further actions detected by the controller 46, then operation moves to the appropriate step in the depicted logic in FIG. 4.

At step S16, the controller 46 causes the control panel 44 to display a prompt for the benefit of the vehicle operator. The prompt is a visual message, such as a text message, asking the vehicle operator whether or not to leave the rear cargo reminder system 16 is the Alert set state as designated in step S12. If the vehicle operator makes an input indicating that the Alert set state is accepted and should proceed, then a variable TemShutOFFSignal is made equal to Yes. If the vehicle operator makes an input indicating that the Alert set state is not accepted and should be discontinued, then the variable TemShutOFFSignal is made equal to No.

At step S17, if variable TemShutOFFSignal is Yes, then operation returns to step S12. At step S18 if the variable TemShutOFFSignal is made equal to No, then operation returns to step S10 and the controller 46 goes back to the Reset state, as described above.

At step S19, like step S14, the controller 46 again determines: whether or not the shifter mechanism 26 has been moved out of the P (Park) setting, or whether or not the vehicle speed is greater than 5 MPH; and whether or not the rear door is closed? If the conditions are met, then the controller 46 moves to step S20 where the vehicle is designated by the controller 46 as being in the Drive State. If the conditions of step S19 are not met, operation returns to step S16.

Once the rear cargo reminder system 16 has achieved the Drive State in step S20, the controller 46 continues to monitor the vehicle 10 to determine whether or not the vehicle 10 continues to be operated in the Drive state. Specifically, at step S21, the controller 46 determines whether or not the shifter mechanism 26 has moved back to P (Park) and/or whether or not the vehicle speed is less than 5 MPH. If not, then the vehicle 10 is still being driven and is in the Drive State at step S20. If yes, then operation moves to step S22 where the controller 46 moves into a Meter Warning state. In the Meter Warning state, the controller 46 causes a prompt or text message to be displayed on the control panel 44, for example, for 5-15 seconds, indicating that cargo or a passenger may be located adjacent to or on the rear seat 28. As in step S16, after step S22, the vehicle operator can make an input indicating that the Alert set state is accepted and should proceed, then a variable TemShutOFFSignal is made equal to Yes. If the vehicle operator makes an input indicating that the Alert set state is not accepted and should be discontinued, then the variable TemShutOFFSignal is made equal to No. Alternatively, the vehicle operator can do nothing, in which case after the 5-15 second time period, the prompt or text message on the control panel 44 shuts off or will shut off when the driver's door is opened at step S25.

Next at step S23, the controller 46 determines whether or not the shifter mechanism 26 has moved out of P (Park) and into either D (Drive) or R (Reverse). If so, then the vehicle 10 is being driven and operation moves back to the Drive State at step S20. If not, operation moves to step S24 where the controller 46 determines whether one of two difference conditions are met. First, the controller 46 determines whether or not one of the rear doors 22 has been opened. If so, control returns to step S10 and the Reset state. If not, the controller 46 checks to see of the other condition is met, namely, what is the current inputted value of TemShutOFFSignal? If TemShutOFFSignal is equal to No, then operation returns to the Reset state in step S10. If TemShutOFFSignal is not equal to No, then operation moves to step S25.

At step S25, the controller 46 determines whether or not the driver's door has been opened. If the driver's door has been opened, then operation moves to step S26 where the controller 46 moves into and Alert Armed state. If the driver's door has not been opened, then operation returns to step S21.

Figure 5:
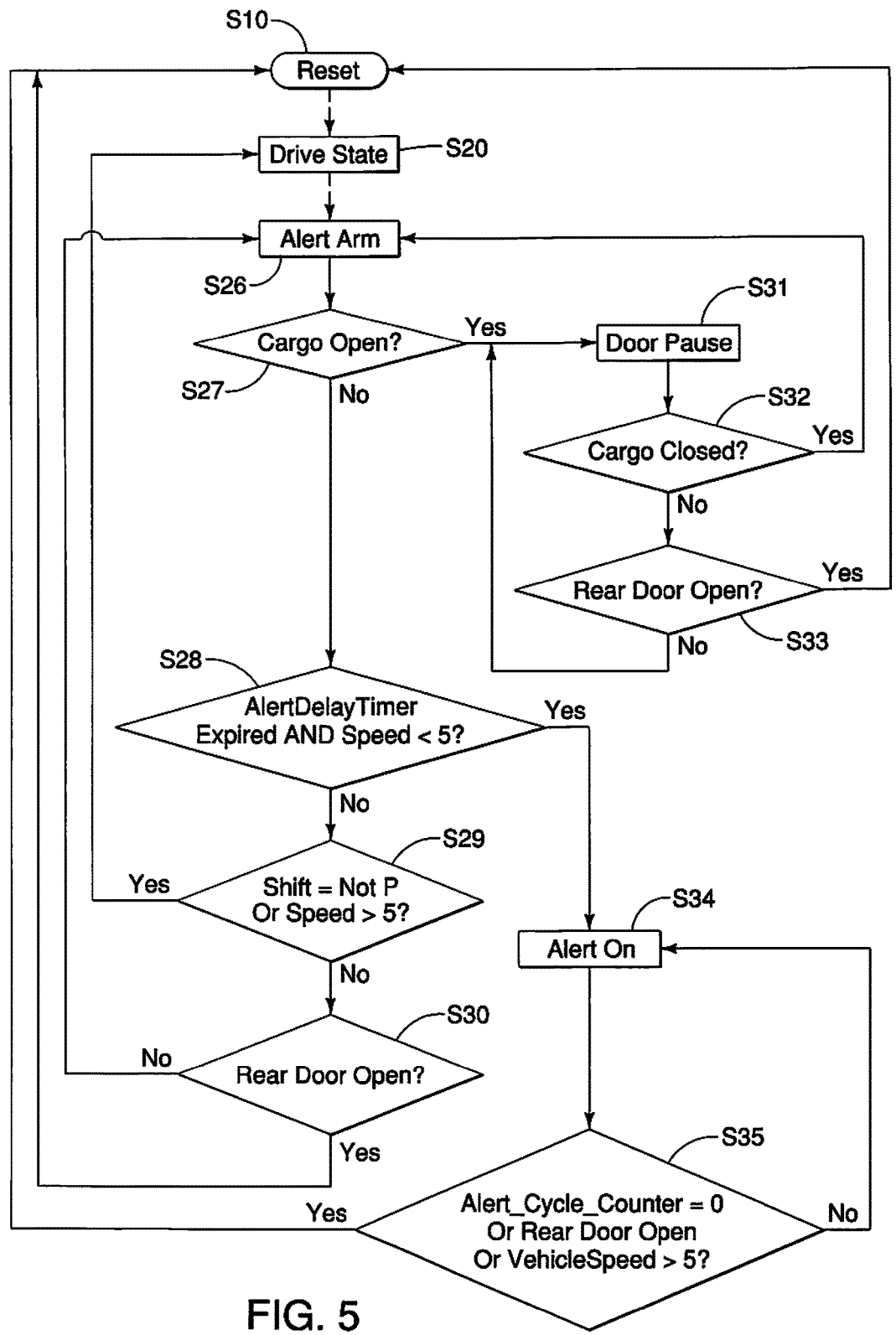
FIG. 5 is a second flowchart showing further basic operational steps of the rear cargo reminder system in accordance with the first embodiment.

In the Alert Armed state, the controller 46 monitors activity relating to steps S27, S28, S29 and S30, as shown in FIG. 5, which is a continuation of the logic set forth in FIG. 4. It should be understood from the depiction in FIG. 5 that the Reset state (step S10), the Drive State (step S20) and the Alert Arm (step S26) are carried over from FIG. 4 for convenience and fully correspond to their respective representations in FIG. 4.

After step S26 at step S27, the controller 46 determines whether or not the rear hatch door 24 (or a trunk lid) has been opened. If so, then operation moves to step S31 as this indicates that the vehicle operator is taking some kind of action related to the vehicle 10. For example, the vehicle operator may be retrieving a stroller or groceries from the rear of the vehicle 10. If not, then operation moves to step S28.

At step S28, the controller 46 determines whether or not two conditions are met. The first condition is the value of a timer AlertDelayTimer. The value of AlertDelayTimer is a counter of anywhere from 5 seconds to 30 seconds (in the depicted embodiment the initial value of AlertDelayTimer is, for example, 10 seconds). The controller 46 begins counting down the value of AlertDelayTimer at step S21, when the shifter mechanism 26 of the vehicle 10 has been put in P (park) and the Meter Warning state in step S22 has been established.

In step S28, if the value of AlertDelayTimer has reached zero and if the speed of the vehicle 10 remains at below 5 MPH, then the controller 46 concludes that the vehicle 10 remains in a parked state (with the shifter mechanism 26 in P (park)) and operation moves to step S34, where the Alert is turned on, as described further below. If the conditions considered by the controller 46 are not met in step S28, operation moves to step S29.

At step S29, the controller 46 determines whether or not the shifter mechanism 26 has been moved from P (park) to either D (drive) or R (reverse), or whether or not the vehicle speed is greater than 5 MPH. If either condition is met, operation moves back to step S20, where the controller 46 re-establishes that the vehicle 10 is in the Drive State and is being driven by the vehicle operator. If neither condition is met at step S29, then operation moves to step S30. At step S30, the controller 46 determines whether or not one of the rear doors 22 has been opened. If yes, then, operation moves to step S10 where the controller 46 returns to the Reset state. If no, then operation returns to the Alert Arm state in step S26.

Returning now to step S31, the controller 46 enters a Door Pause state. In this state, the controller 46 monitors the state of the rear hatch door 24 (or trunk lid), which was determined to be open in step S27. Next at step S32, if the rear hatch door 24 is moved to a closed position, then operation moves back to step S26 and the Alert Arm state. If not, operation moves to step S33. At step S33, the controller 46 determines whether or not one of the rear doors 22 has been opened. If so, then operation returns to step S10 and the Reset state. If not, then operation moves to step S31, continuing the Door Pause state.

Returning now to step S34, from step S28 when the AlerDelayTimer has expired, the controller 46 causes an alert to be given to the vehicle operator. The alert in step S34 can be any of a variety of alert actions, depending upon the vehicle 10 and optional pre-sets selected by the vehicle operator. For example, the alert at step S34 can be an audio alert includes short chirps of a sounding of the horn, or sounding of a buzzer in the instrument panel, vibration of the keyfob, or signals sent to a mobile phone linked to the vehicle 10 by the vehicle operator. Further, a visual alert can be displayed on the control panel 44.

Next, the controller 46 moves to step S35 where any one of a variety of conditions can trigger an end to the alert, and a return to the Reset state at step S10. Specifically, at step S35 the controller 46 determines one of the following whether or not a variable Alert_Cycle_Counter has reached a value of zero; whether or not one of the rear doors 22 has been opened; or whether or not the vehicle 10 is in motion (vehicle speed greater than 5 MPH). If any one of the conditions in step S35 is met, operation returns to step S10 and the Reset state. If none of the conditions in step S35 are met, operation returns to step S34 where the alert continues to be provided.

The variable Alert_Cycle_Counter is a counter of the number of times the alert cycle repeats. For example, if the alert includes three short chirps of the vehicle horn, then the variable Alert_Cycle_Counter corresponds to the number of times the alert is repeated. In the depicted embodiment, the variable Alert_Cycle_Counter is six. In other words, if the alert is three short chirps of the vehicle horn lasting approximately 1.5 seconds in length with a two second pause, the alert would be repeated a total of six times unless one of the other conditions in step S35 is met.

The logic presented in FIGS. 4 and 5 is one example of the logic that is used by the controller 46. Basically, the controller 46 can provide an alert to the vehicle operator indicating that cargo or a passenger is adjacent to or on the rear seat 28, in response to a simple sequence of actions that includes: 1) one of the rear doors 22 being opened and closed; 2) the driver's door 20 being opened and closed; 3) the vehicle 10 being driven; and 4) the driver's door 20 being opened again. If no further actions are taken, then the alert can be provided by the controller 46. While other actions are possible as set forth in FIGS. 4 and 5, the four actions mentioned above are sufficient to trigger the alert (visual and/or audible).

Using the above basic logic, the controller 46 determines whether or not the vehicle operator has potentially left an object, cargo or a passenger adjacent to or on the rear seat 28 in the passenger compartment 14. This determination is made by the controller 46 in response to detecting movement of the front door 20 and the rear doors 22 via signals from the sensors 30, 32 and 34 detecting movements of the front doors 20 and the rear doors 22. If it is determined that an object, cargo or passenger may have been left within the vehicle 10, the controller 46 provides an alert or an alarum to the vehicle operator in the hopes that the vehicle operator will retrieve the object, cargo or passenger.

There are many possible sequences of events that can trigger the controller 46 to issue an alert indicating that the vehicle operator has left an object in the rearward area of the passenger compartment 14. The following table shows an example of a minimal number qualifying sequences of events that can trigger the alert.

TABLE 1

| Sequence | Drive State | Driver Door | Rear Door | Text Display | Timer | Alert |
|---|---|---|---|---|---|---|
| 1 | No | Close | Close | Off | Off | Off |
| 2 | No | Close | Open | Off | Off | Off |
| 3 | No | Close | Close | Off | Off | Off |
| 4 | No | Open | Open | Off | Off | Off |
| 5 | No | Close | Close | Off | Off | Off |
| 6 | Yes | Close | Close | Off | Off | Off |
| 7 | No | Close | Close | Off | Off | Off |
| 8 | No | Close | Close | ON | Off | Off |
| 9 | No | Open | Close | ON | Off | Off |
| 10 | No | Close | Close | Off | Off | Off |
| 11 | No | Close | Close | Off | Active | Off |
| 12 | No | Close | Close | Off | Off | On |

In Table 1, the sequence outlined includes the following basic activities recorded by the controller 46 that are qualifying events:

1. Reset State—Vehicle not in motion
2. Rear door(s) open indicating placement of object by or on rear seat 28
3. Rear door(s) closed
4. Driver Door opened
5. Driver Door closed
6. Vehicle out of P (Park)—Drive State
7. Vehicle not in motion
8. Prompt State (Text message displayed)
9. Driver's Door opened
10. Driver's Door closed
11. Alert Arm
12. Alert Device enabled (beep, horn, lights, vibration, etc.)

Once one of the rear doors 22 is opened, the alert device is disabled by the controller 46.

The controller 46 preferably includes a microcomputer with an activity monitoring and recording control program that controls the alerting device 36. The controller 46 can also include other conventional components such as an input interface circuit, an output interface circuit, and storage devices such as a ROM (Read Only Memory) device and a RAM (Random Access Memory) device. The microcomputer of the controller 46 is programmed to control the rear cargo reminder system 16. The memory circuit stores processing results and control programs such as ones for monitoring, recording, evaluating and processing operations that are run by the processor circuit. The internal RAM of the controller 46 stores statuses of operational flags and various control data, and can define the data storage portion, which stores the qualifying sequences. The internal ROM of the controller 46 stores the programming for various operations described above. It will be apparent to those skilled in the art from this disclosure that the precise structure and algorithms for the controller 46 can be any combination of hardware and software that will carry out the functions of the present invention.

The elements of the vehicles 10 and 110 other than the rear cargo reminder system 16 are conventional components that are well known in the art. Since these vehicle elements are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the rear cargo reminder system. Accordingly, these terms, as utilized to describe the present invention should be interpreted relative to a vehicle equipped with the rear cargo reminder system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A rear cargo reminder system comprising:
a vehicle having a passenger compartment with a rear seat;
a front door fixed to the vehicle for movement between an open orientation and a closed orientation;
a front door sensor configured to detect opening movement and closing movement of the front door;
a rear door attached to the vehicle for movement between an open orientation providing access to the rear seat and a closed orientation;
a rear door sensor installed within the vehicle and configured to detect opening movement and closing movement of the rear door;
an alerting device configured to provide an alarm signal; and
a controller operably connected to each of the front door sensor, the rear door sensor and the alerting device, the controller operating in the absence of detection of conditions of an ignition switch of the vehicle and in the absence of detection of operating state of an engine of the vehicle, such that in response to the controller detecting a sequence of events based on detection of movement of the front door via the front door sensor and movement of the rear door via signals from the rear door sensor the controller determines whether or not the vehicle operator has potentially left an object beside or on the rear seat of the passenger compartment, and in response to determining that the vehicle operator has potentially left an object beside or on the rear seat of the passenger compartment the controller operates the alerting device to provide the alarm signal to the vehicle operator, the controller operating in the absence of an occupancy sensor such as a microphone, a temperature sensor, a seat weight sensor, movement sensor or any other type of sensor configured to detect the presence or absence of an occupant within the vehicle.

2. The rear cargo reminder system according to claim 1, further comprising
a speed sensor configured to detect a speed of the vehicle.

3. The rear cargo reminder system according to claim 2, wherein
the controller is further operably connected to the speed sensor such that the controller further determines whether or not the vehicle operator has potentially left an object beside or on the rear seat of the passenger compartment in response to monitoring the speed of the vehicle.

4. The rear cargo reminder system according to claim 1, further comprising
a vehicle transmission with a shifting device movable between a parked position, forward drive position and rearward drive position; and
a shifter position sensor configured to output signals to the controller corresponding to the current setting of the shifting device.

5. The rear cargo reminder system according to claim 4, wherein
the controller is further operably connected to the shift position sensor such that the controller further determines whether or not the vehicle operator has potentially left an object beside or on the rear seat of the passenger compartment in response to monitoring a current setting of the shifter position sensor of the vehicle.

6. The rear cargo reminder system according to claim 1, wherein
the alerting device includes a display installed to the instrument panel within the passenger compartment and the alarm signal includes a visual signal provided on the display.

7. The rear cargo reminder system according to claim 1, wherein
the alerting device is installed within a keyfob operated by the vehicle operator.

8. The rear cargo reminder system according to claim 1, wherein
the alarm signal produced by the alerting device includes at least one or more of the following: a visual alarm, an audible alarm and a vibratory alarm.

9. The rear cargo reminder system according to claim 1, wherein
the controller determines whether or not the vehicle operator has potentially left an object beside or on the rear seat of the passenger compartment without use of a sensor that detects occupancy of the vehicle.

10. A rear cargo reminder system comprising:
a vehicle having a passenger compartment with a rear seat;
a front door fixed to the vehicle for movement between an open orientation and a closed orientation;
a front door sensor configured to detect opening movement and closing movement of the front door;

a rear door attached to the vehicle for movement between an open orientation providing access to the rear seat and a closed orientation;

a rear door sensor installed within the vehicle and configured to detect opening movement and closing movement of the rear door;

a transmission shifter mechanism;

a shifter position sensor installed to the vehicle and configured to detect a current position of the transmission shifting device;

an alerting device configured to provide an alarm signal; and a controller operably connected to each of the front door sensor, the rear door sensor, the shifter position sensor and the alerting device, the controller operating in the absence of detection of conditions of an ignition switch of the vehicle and in the absence of detection of operating state of an engine of the vehicle, such that in response to the controller detecting a sequence of events based on detection of movement of the front door via the front door sensor, movement of the rear door via signals from the rear door sensor and current position of the transmission shifting mechanism via the shifter position sensor, the controller determines whether or not the vehicle operator has potentially left an object beside or on the rear seat of the passenger compartment, and in response to determining that the vehicle operator has potentially left an object beside or on the rear seat of the passenger compartment the controller operates the alerting device to provide the alarm signal to the vehicle operator, the controller operating in the absence of an occupancy sensor such as a microphone, a temperature sensor, a seat weight sensor, movement sensor or any other type of sensor configured to detect the presence or absence of an occupant within the vehicle.

11. The rear cargo reminder system according to claim 10, wherein the controller determines whether or not the vehicle operator has potentially left an object beside or on the rear seat of the passenger compartment without use of a sensor that detects occupancy of the vehicle.

12. The rear cargo reminder system according to claim 10, wherein the controller determines whether or not the vehicle operator has potentially left an object beside or on the rear seat of the passenger compartment in the absence of detection of conditions of an ignition switch of the vehicle.

* * * * *